United States Patent [19]

Hiromoto et al.

[11] Patent Number: 5,137,933

[45] Date of Patent: Aug. 11, 1992

[54] FOAMABLE RESIN COMPOSITION

[75] Inventors: Yasuyuki Hiromoto; Hiroyuki Toh; Kouichi Matsuda; Hideo Goto, all of Yamaguchi, Japan

[73] Assignee: Ube Cycon, Ltd., Tokyo, Japan

[21] Appl. No.: 827,156

[22] Filed: Jan. 28, 1992

[30] Foreign Application Priority Data

Mar. 4, 1991 [JP] Japan .................................. 3-37349

[51] Int. Cl.$^5$ .............................. C08J 9/08; C08J 9/10
[52] U.S. Cl. ...................................... 521/139; 521/81; 521/138; 521/140; 525/71
[58] Field of Search ................. 521/81, 138, 139, 140; 525/71

[56] References Cited

U.S. PATENT DOCUMENTS 5,043,115  8/1991  Aoshima et al. ..................... 521/140
5,053,438 10/1991  Kozma ................................. 521/140
5,071,886 12/1991  Aoshima et al. ..................... 521/140

Primary Examiner—Morton Foelak
Attorney, Agent, or Firm—Kanesaka and Takeuchi

[57] ABSTRACT

A foaming agent is mixed to a thermoplastic resin composition containing a graft copolymer obtained by emulsion graft polymerization of a vinyl monomer to an ethylene-propylene-non-conjugated diene copolymer rubber latex comprising from 0.1 to 30 parts by weight of a modified low molecular weight α-olefin copolymer uniformly dispersion in 100 parts by weight of an ethylene-propylene-non-conjugated diene copolymer.

5 Claims, No Drawings

FOAMABLE RESIN COMPOSITION

FIELD OF THE INVENTION AND RELATED ART STATEMENT

The present invention concerns a foamable resin composition and, more in particular, it relates to a foamable resin composition capable of easily foaming at a high rate of expansion, excellent in the surface appearance of products and with improved take-off speed upon extrusion molding.

A polymer prepared by copolymerizing, for example, styrene and acrylonitrile to an ethylene-propylene-non-conjugated diene copolymer rubber has been known as an AES resin and it has excellent weather proofness, impact resistance and surface gloss.

By the way, in a case of providing a thermoplastic resin composition with a foaming property, an organic or inorganic foaming agent has generally been mixed together with an extender and then molded by an extrusion or injection molding machine.

With such a method, however, since dispersion of rubber particles at the inside of the resin is made not uniform due to foaming in a rubber-reinforced styrenic resin such as an AES resin, it has been difficult to obtain a highly foamed molding product having satisfactory surface appearance and it is also difficult to obtain a less foamed molding product of excellent surface appearance at present. In particular, when a great amount of a foaming agent is used with an aim of obtaining a highly foamed molding product, since the compatibility of the foaming agent with the resin is not sufficient, the resin causes no uniform dispersion thereby tending to bring about problems such as bleeding, open cells and surface unevenness to the molding product.

Further, in a case of manufacturing a foamed plate product by using an extruder, if the take-off speed is increased the rate of expansion is remarkably reduced and, accordingly, it inevitably restricts the drawing speed, which brings about a problem in view of the productivity.

OBJECT AND SUMMARY OF THE INVENTION

An object of the present invention is to overcome the foregoing problems in the prior art and to provide a foamable resin composition capable of easily foaming at a high rate of expansion, excellent in the surface appearance of products and with improved take-off speed upon extrusion molding.

The feature of the foamable resin composition according to the present invention lies in mixing a foaming agent to a thermoplastic resin composition containing a graft copolymer prepared by emulsion graft polymerization of a vinyl monomer to an ethylene-propylene-non-conjugated diene copolymer rubber latex comprising 0.1 to 30 parts by weight of a modified low molecular weight α-olefin copolymer dispersed uniformly in 100 parts by weight of an ethylene-propylene-non-conjugated diene copolymer.

The present inventors have made an earnest study for overcoming the foregoing problems in the prior art and, as a result, have found that a foamable resin composition of excellent surface appearance, capable of easily foaming at a high rate of expansion and with improved take-off speed upon extrusion molding can be obtained by using, a graft copolymer polymerized by using an ethylene-propylene-non-conjugated diene copolymer rubber latex having a specific structure as one of ingredients in a thermoplastic resin composition, and have accomplished the present invention based on the above-mentioned finding.

Details for the function and mechanism given by the graft copolymer of the specific structure to the foaming property of the foamable resin composition in the present invention are not yet apparent at present, but it is considered that the modified low molecular weight α-olefin copolymer dispersed uniformly on EPDM rubber particles gives an effect in some or other ways to the foaming property to thereby provide preferred characteristics.

DESCRIPTION OF THE PREFERRED EMBODIMENTS

The present invention will now be explained more in details.

The ethylene-propylene-non-conjugated diene copolymer (hereinafter simply referred to as "EPDM") as the rubber ingredient of the graft copolymer in the present invention is a rubbery copolymer of ethylene, propylene and non-conjugated diene. The concentration of ethylene contained is preferably from 30 to 90 mol % and, for example, 1,4-hexadiene, 5-ethylidene-2-norbornene, 5-vinylnorbornene and dicyclopentadiene are preferred as the non-conjugated diene ingredient.

On the other hand, as the modified low molecular weight α-olefin copolymer uniformly dispersed into the EPDM, there can be mentioned, for example, an acid modified polyethylene containing 99.8 to 80% by weight of α-olefin and 0.2 to 20% by weight of an unsaturated carboxylic acid. In this case, ethylene or the like is preferred as the α-olefin and acrylic acid, maleic acid, itaconic acid, maleic acid anhydride, itaconic acid anhydride, maleic monoamide or the like is preferred as the unsaturated carboxylic acid.

When such a modified low molecular weight α-olefin copolymer is blended by more than 0.1 parts by weight based on the 100 parts by weight of the EPDM, it is possible to improve the foaming property of the finally obtained foamable resin composition and the surface appearance of the product, as well as to improve the take-off speed in the extrusion molding. However, if the blending amount of the modified low molecular weight α-olefin copolymer exceeds 30 parts by weight, the surface appearance of the product is worsened and open cells, instead of close cells, are formed. Accordingly, the amount of the modified low molecular weight α-olefin copolymer is defined as from 0.1 to 30 parts by weight based on 100 parts by weight of the EPDM.

As the vinyl monomer to be graft copolymerized to the EPDM latex, there can be mentioned styrene, α-methylstyrene, p-methylstyrene, acrylonitrile, methacrylonitrile, methyl acrylate, methyl methacrylate, maleimide, N-methyl maleimide and N-phenyl maleimide, which may be used alone or as a mixture of two or more of them. The weight ratio of the EPDM latex (as the solid content) to the vinyl monomer is preferably within a range from 40:60 to 80:20.

The graft copolymer according to the present invention is preferably prepared by emulsion graft polymerization, for example, as shown below.

At first, an EPDM latex in which a modified low molecular weight α-olefin copolymer is uniformly dispersed is prepared. In this case, addition of a small amount of a polyhydric alcohol such as ethylene glycol is effective. That is, the EPDM and the modified low molecular weight α-olefin copolymer are dissolved in an appropriate solvent, which are emulsified with addition of an emulsifier and then a polyhydric alcohol is added thereto. In this case, an aliphatic or cycloaliphatic hydrocarbon solvent such as n-hexane or cyclohexane can be used as the solvent. There is no particular restriction for the emulsifier and, for example, an anionic surface active agent potassium oleate and dispropornationed potassium rosinate can be used. When the latex is stirred sufficiently and the solvent is removed by distillation, an EPDM latex with a grain size of about 0.2 to 1 μm can be obtained.

Then, the EPDM latex is applied with a crosslinking treatment by using a polyfunctional compound such as divinylbenzene and an organic peroxide such as di-t-butyloxytrimethyl cyclohexene, and one or more of the vinyl monomer described above is grafted to the thus obtained crosslinked latex. In this case, it is preferred in view of the stabilization for the polymerization to dissolve a redox type initiator comprising a combination of an oil soluble organic peroxide and a ferrous sulfate-chelating agent-reducing agent and add it continuously into the polymerization system for more than 1 hour.

An antioxidant is added as required to the graft copolymer obtained after the completion of the polymerization. Subsequently, a solid resin content is deposited from the resultant graft copolymer latex. In this case, as the depositing agent, an aqueous solution of sulfuric acid, acetic acid, calcium chloride and magnesium sulfate can be used alone or as a mixture. The depositing agent-added graft copolymer latex is heated and stirred and then the deposition product is separated therefrom, which is then washed with water, dehydrated and dried to obtain a graft copolymer.

There is no particular restriction to the thermoplastic resin composition in the present invention so long as the composition contains the thus obtained graft copolymer, which is used usually in admixture with a styrenic rigid copolymer such as styrene-acrynonitrile copolymer, styrene-α-methylstyrene-acrylonitrile copolymer, styrene-α-methylstyrene-N-phenyl maleimideacrylonitrile copolymer, or the composition may be mixed with a resin referred to as an engineering plastic such as polycarbonate, nylon or polybutylene terephthalate. The content of the graft copolymer in the thermoplastic resin composition is preferably from 5 to 70% by weight. If the ratio is less than 5% by weight, no uniform foaming at a high rate of expansion can be attained. On the other hand, if the ratio exceeds 70% by weight, the surface appearance of the product is remarkably worsened.

In the present invention, known organic or inorganic foaming agents can be used as the foaming agent and, specifically, there can be mentioned, for example, alkali metal carbonate such as sodium carbonate and potassium carbonate, alkaline earth metal carbonate such as calcium carbonate and magnesium carbonate, azo compound such as azo-dicarbonamide, 1,1-azobisformamide, azobisisobutyronitrile, nitroso compound such as dinitrosopentamethylene tetramine, and sulfonyl hydrazide compound such as benzene sulfonyl hydrazide. The mixing ratio of the foaming agent is preferably from 0.1 to 5 parts by weight based on 100 parts by weight of the thermoplastic resin composition. If the ratio is less than 0.1 parts by weight, foaming at a high expansion rate is difficult and, on the other hand, the appearance of the product is remarkably worsened if the ratio exceeds 5 parts by weight.

When the thermoplastic resin composition according to the present invention is used for foaming molding, other additives such as antioxidant, pigment, lubricant and filler may be added as required in addition to the foaming agent as described above.

As has been described above specifically, by the foamable resin composition according to the present invention, a foamed molding product having satisfactory characteristics with excellent surface appearance of products, capable of easily foaming at a high rate of expansion and with improved take-off speed in extrusion molding can be obtained. Accordingly, the foamable resin composition of the present invention is extremely useful as the production material for food packaging containers, building interior materials and decorative articles requiring aesthetic appearance.

The present invention will now be described more specifically referring to preparation examples, examples and comparative examples but the present invention is not restricted only to the following examples unless it goes beyond the scope of the invention. In the following descriptions, "parts" means "parts by weight".

PREPARATION EXAMPLE 1

Preparation of EPDM Rubber Latex and Graft Copolymer

After dissolving 100 parts of EPDM (EPT3012P) manufactured by Mitsui Petrochemical Co into 566 parts of n-hexane, a modified polyethylene (Hiwax 2203A) manufactured by Mitsui Petrochemical Co. was added by the amount shown in Table 1. Then, oleic acid was further added and dissolved completely to prepare a polymer solution. Separately, 0.5 parts of ethylene glycol was added to an aqueous solution containing 0.9 parts of KOH dissolved in 700 parts of water, which was kept at 60° C. Then, after gradually adding to emulsify the polymer solution prepared as above, the emulsion was stirred by a homomixer. Subsequently, the solvent and a portion of water were distilled off to obtain a latex with a particle size of 0.4 to 0.6 μm. 1.5 parts of divinylbenzene and 1.0 parts of di-t-butyl peroxy trimethyl cyclohexane were added into the latex based on 100 parts of the EPDM as the rubbery ingredient and reacted at 120° C. for one hour to prepare EPDM-containing crosslinked latexes No. (1-1)–(1-4).

Polymerization was conducted by using the resultant EPDM-containing crosslinked latexes No. (1-1)–(1-4) and charging the starting materials with the formulations shown by No. (2-1)–(2-4) shown in Table 2 in a stainless steel polymerization vessel equipped with a stirrer. The polymerization temperature was kept constant at 80° C. The addition time of the ingredient B to the ingredient A was 150 min. and the addition time of the ingredient C was 180 min.

After the completion of the polymerization, an antioxidant was added and a solid content was deposited by sulfuric acid and, by way of the steps of washing, dehydration and drying, a powder of a graft copolymer was obtained.

TABLE 1

| EPDM-containing | (Blending unit: parts) | | | |
|---|---|---|---|---|
| latex No. | 1-1 | 1-2 | 1-3 | 1-4 |
| Blend | | | | |
| Emulsification | | | | |
| EPDM (3012P) | 100 | 100 | 100 | 100 |
| Acid-modified | 0 | 1 | 10 | 35 |

TABLE 1-continued

| EPDM-containing latex No. | 1-1 | 1-2 | 1-3 | 1-4 |
|---|---|---|---|---|
| polyethylene | | | | |
| n-hexane | 566 | 566 | 566 | 566 |
| Ethylene glycol | 0.5 | 0.5 | 0.5 | 0.5 |
| Oleic acid | 4.5 | 4.5 | 4.5 | 4.5 |
| Water | 700 | 700 | 700 | 700 |
| KOH | 0.9 | 0.9 | 0.9 | 0.9 |
| Crosslinking | | | | |
| Divinylbenzene | 1.5 | 1.5 | 1.5 | 1.5 |
| Di-t-butylperoxytrimethylcyclohexane | 1.0 | 1.0 | 1.0 | 1.0 |
| Remarks | Comparative Example | Example | Example | Comparative Example |

(Blending unit: parts)

TABLE 2

| Graft copolymer No. | 2-1 | 2-2 | 2-3 | 2-4 | 2-5 |
|---|---|---|---|---|---|
| Ingredient A | | | | | |
| EPDM-containing latex No. 1-1 | 70 | | | | |
| (as solid 1-2 | | 70 | | | |
| content) 1-3 | | | 70 | | 70 |
| 1-4 | | | | 70 | |
| Water (including water content in latex) | 170 | 170 | 170 | 170 | 170 |
| Sodium hydroxide | 0.01 | 0.01 | 0.01 | 0.01 | 0.01 |
| Sodium phyrophosphate | 0.45 | 0.45 | 0.45 | 0.45 | 0.45 |
| Ferrous sulfate | 0.01 | 0.01 | 0.01 | 0.01 | 0.01 |
| Dextrose | 0.57 | 0.57 | 0.57 | 0.57 | 0.57 |
| Ingredient B | | | | | |
| Acrylonitrile | 9 | 9 | 9 | 9 | — |
| Styrene | 21 | 21 | 21 | 21 | 30 |
| CHP | 1.0 | 1.0 | 1.0 | 1.0 | 1.0 |
| Ingredient C | | | | | |
| Sodium phyrophosphate | 0.45 | 0.45 | 0.45 | 0.45 | 0.45 |
| Ferrous sulfate | 0.01 | 0.01 | 0.01 | 0.01 | 0.01 |
| Dextrose | 0.56 | 0.56 | 0.56 | 0.56 | 0.56 |
| Sodium oleate | 1.0 | 1.0 | 1.0 | 1.0 | 1.0 |
| Water | 30 | 30 | 30 | 30 | 30 |
| Reaction temperature (°C.) | 80 | 80 | 80 | 80 | 80 |
| Remarks | Comparative Example | Example | Example | Comparative Example | Example |

(Blending unit: parts)

PREPARATION EXAMPLE 2

Preparation of Styrenic Rigid Copolymer

After sufficiently replacing the inside of an autoclave equipped with a stirrer with nitrogen, monomer, distilled water, surface active agent, suspension stabilizer and organic peroxide were charged each by a predetermined amount in a ratio shown in Table 3, the inner temperature was elevated under stirring at 350 rpm to 80° C. and then they were polymerized at that temperature for 9 hours. Subsequently, the temperature was elevated to 120° C. for 2.5 hr and reaction was conducted at that temperature for 2 hr. After washing the resultant slurry, it was dried to obtain styrenic rigid copolymers No. (3-1)-(3-3).

TABLE 3

| Rigid copolymer No. | 3-1 | 3-2 | 3-3 | 3-4 |
|---|---|---|---|---|
| Blend | | | | |
| Water | 120 | 120 | 120 | 120 |
| ABSNa *1 | 0.003 | 0.003 | 0.003 | 0.003 |
| Acrylonitrile | 30 | 29 | 27 | — |
| Styrene | 70 | 6 | 23 | 100 |
| α-methylstyrene | — | 65 | 37 | — |
| N-PMI *2 | — | — | 13 | — |
| BPO *3 | 0.7 | 0.7 | 0.7 | 1.0 |
| TBP *4 | 0.07 | 0.07 | 0.07 | 0.1 |
| TCP *5 | 0.6 | 0.6 | 0.6 | 0.6 |
| TDM *6 | 0.18 | 0.1 | 0.1 | 0.1 |
| Monomer conversion ratio (%) | 98 | 96 | 97 | 98 |
| Remark | Example | Example | Example | Example |

(Blending unit: parts)

*1 sodium alkylbenzene sulfonate
*2 N-phenylmaleimide
*3 benzoylperoxide
*4 t-butylperoxybenzoate
*5 calcium phosphate
*6 t-dodecylmercaptane

EXAMPLES 1-4, COMPARATIVE EXAMPLE 1, 2

The graft copolymer obtained in the Preparation Example 1 and the styrenic rigid copolymer obtained in the Preparation Example 2 were kneaded together with 0.5 parts of calcium stearate and 1.5 parts of N,N'-ethylenebisstearylamide in each of blending ratioes shown in Table 4 in a Banbury mixer into pellets.

The resultant pellets were covered with 0.3 parts of Vinihole AC-LQ (manufactured by Eiwa Kasei Co.) as a foaming agent, 0.3 parts of Polyzomal MS (manufactured by Tokyo Shin-Nippon Kasei Co) as an extender and 0.2 parts of talc and then extrusion molded under the following conditions.

| Extrusion condition: Extender, 40 mm single screw (manufactured by Tanifugi Kikai Kogyo Co.) | |
|---|---|
| C1 160° C., C2 180° C., C3 200° C., C4 210° C., D 210° C. | |
| Number of rotation of screw | 40 rpm |
| Thickness and width of sheet | 8 mm × 40 mm |
| Take-off speed | 0.5 m/min |

The resultant foamed molding products were tested for their characteristics under the following conditions and the methods, and results are shown in Table 4.

| Surface appearance: | Evaluated with naked eyes based on the following standards |
|---|---|
| ○: | good |
| Δ: | somewhat rough |
| X: | rough |
| Surface gloss: | according to JIS Z 8741 (reflectance at an incident angle of 60°) |
| State of inner foaming: | Cross section of foamed molding product was observed with naked eyes. |
| I | closed cell |
| II | partial open |
| III | open cell |

From Table 4, it can be seen that the foamable resin composition according to the present invention is a highly foamed product having excellent surface appearance, surface gloss and closed cells.

TABLE 4

| Example | | Comparative Example 1 | Example 1 | Example 2 | Comparative Example 2 | Example 3 | Example 4 |
|---|---|---|---|---|---|---|---|
| Resin composition No. | | 4-1 | 4-2 | 4-3 | 4-4 | 4-5 | 4-6 |
| Blend (part) | | | | | | | |
| Graft | 2-1 | 35 | | | | | |
| copolymer | 2-2 | | 35 | | | | |
| No. | 2-3 | | | 35 | | 35 | 35 |
| | 2-4 | | | | 35 | | |
| | 2-5 | | | | | | |
| Rigid | 3-1 | 65 | 65 | 65 | 65 | | |
| copolymer | 3-2 | | | | | 65 | |
| No. | 3-3 | | | | | | 65 |
| | 3-4 | | | | | | |
| Hiwax 2203A | | | | | | | |
| ABS resin | | | | | | | |
| Polycarbonate | | | | | | | |
| Nylon-6 | | | | | | | |
| Polybutylene terephthalate | | | | | | | |
| Polyphenylene ether | | | | | | | |
| AES resin | | | | | | | |
| Extender | | 0.3 | 0.3 | 0.3 | 0.3 | 0.3 | 0.3 |
| Vinihole | | 0.3 | 0.3 | 0.3 | 0.3 | 0.3 | 0.3 |
| Ac-LQ | | | | | | | |
| Sodium carbonate | | | | | | | |
| Talc | | 0.2 | 0.2 | 0.2 | 0.2 | 0.2 | 0.2 |
| Property | | | | | | | |
| Surface appearance | | X | ○ | ⊚ | Δ | ⊚ | ⊚ |
| Surface gloss (%) | | 63.8 | 81.4 | 82.6 | 80.8 | 85.3 | 86.6 |
| State of inner foaming | | II | I | I | III | I | I |
| Specific gravity (g/cm$^3$) | | 0.88 | 0.25 | 0.27 | 0.45 | 0.42 | 0.47 |

COMPARATIVE EXAMPLE 3

The graft copolymer (2-1) obtained in the Preparation Example 1, the styrenic rigid polymer (3-1) obtained in the Preparation Example 2 and, further, a modified polyethylene manufactured by Mitsui Petrochemical Co. (Hiwax 2203A) were kneaded together with 0.5 parts of calcium stearate and 1.5 parts of N,N'-ethylenebisstrearylamide at each of blending ratioes as shown in Table 5 in a Banbury mixer into pellets.

The resultant pellets were extrusion molded in the same manner as in Example 1, and various characteristics were tested for the resultant formed molding products and the results are shown in Table 5.

It can be seen from Table 5 that addition of the modified polyethylene (Hiwax 2203A) upon compounding provides no substantial effect.

EXAMPLES 5-9

The graft copolymer (2-3) obtained in the Preparation Example 1, ABS resin (Cycolac-T, manufactured by Ube Cycon, Ltd.), polycarbonate (L-1250, manufactured by Teijin Kasei Co.), Nylon-6 (Nylon 1022, manufactured by Ube Kosan Co.), polybutylene terephthalate (1401-X07, manufactured by Toray Co.), polyphenylene ether (synthesized from 2,6-dimethylphenol by oxidizing polymerization ($\tau$)=0.51) were, respectively, kneaded together with 0.5 parts of calcium stearate and 1.5 parts of N,N'-ethylenebisstearylamide at each of blending ratioes shown in Table 5 into pellets by a 20 mm twin-screw extruder.

The resultant pellets were extrusion molded in the same manner as in Example 1 and various characteristics were tested for the resultant foamed molding products and the results are shown in Table 5.

From Table 5, it can be seen that any of the foamed molding products shows satisfactory property.

TABLE 5

| Example | | Comparative Example 3 | Example 5 | Example 6 | Example 7 | Example 8 | Example 9 |
|---|---|---|---|---|---|---|---|
| Resin composition No. | | 4-7 | 4-8 | 4-9 | 4-10 | 4-11 | 4-12 |
| Blend (part) | | | | | | | |
| Graft | 2-1 | 35 | | | | | |
| copolymer | 2-2 | | | | | | |
| No. | 2-3 | | 30 | 30 | 30 | 30 | |
| | 2-4 | | | | | | |
| | 2-5 | | | | | | 30 |
| Rigid | 3-1 | 60 | 40 | 40 | 40 | 40 | |
| copolymer | 3-2 | | | | | | |
| No. | 3-3 | | | | | | |
| | 3-4 | | | | | | 40 |
| Hiwax 2203A | | 5 | | | | | |
| ABS Resin | | | 30 | | | | |

TABLE 5-continued

| Example | Comparative Example 3 | Example 5 | Example 6 | Example 7 | Example 8 | Example 9 |
|---|---|---|---|---|---|---|
| Polycarbonate | | | 30 | | | |
| Nylon-6 | | | | 30 | | |
| Polybutylene terephthalate | | | | | 30 | |
| Polyphenylene ether | | | | | | 30 |
| AES resin | | | | | | |
| Extender | 0.3 | 0.3 | 0.3 | 0.3 | 0.3 | 0.3 |
| Vinihole AC-LQ | 0.3 | 0.3 | 0.3 | 0.3 | 0.3 | 0.3 |
| Sodium carbonate | | | | | | |
| Talc | 0.2 | 0.2 | 0.2 | 0.2 | 0.2 | 0.2 |
| Property | | | | | | |
| Surface appearance | X | ◉ | ◉ | ◉ | ◉ | ◉ |
| Surface gloss (%) | 68.2 | 78.8 | 83.2 | 86.3 | 80.6 | 84.3 |
| State of inner foaming | II | I | I | I | I | I |
| Specific gravity (g/cm³) | 0.82 | 0.32 | 0.26 | 0.37 | 0.26 | 0.35 |

COMPARATIVE EXAMPLES 4, 5

ABS resin (Cycolac-T, manufactured by Ube Cycon, Ltd.) and commercially available AES resin (UB-600, manufactured by Sumitomo Kagaku Kogyo Co.) were respectively, covered with 0.3 parts of Vinihole AC-LQ (manufactured by Eiwa Kasei Co.) as a foaming agent, 0.3 parts of Polyzomal MS (manufactured by Tokyo Shin-Nippon Kasei Co.) as an extender and 0.2 parts of talc, and they were extrusion moled in the same manner as in Example 1. Various characteristics were tested for the resultant foamed molding products and the results are shown in Table 6.

From Table 6, it can be seen that no satisfactory property can be obtained with the use of the ABS resin or the commercially available AES resin alone.

EXAMPLE 10

The graft copolymer (2-3) obtained in the Preparation Example 1 and the styrenic rigid copolymer (3-1) obtained in the Preparation Example 2 were kneaded together with 0.5 parts of calcium stearate and 1.5 parts of N,N'-ethylenebisstearylamide at a blending ratio shown in Table 6 in the Banbury mixer into pellets. The resultant pellets were covered with 0.5 parts of sodium carbonate as the foaming agent, 0.3 parts of Polyzomal MS (manufactured by Tokyo Shin-Nippon Kasei Co.) as an extender, and 0.2 parts of talc, and then extrusion molded in the same manner as in Example 1. Various characteristics were tested for the resultant foamed molding products and the results are shown in Table 6.

As can be seen from Table 6, the foamable resin composition according to the present invention is a highly foamed product of excellent surface appearance and surface gloss and having closed cells when it is foamed also by using sodium carbonate.

TABLE 6

| Example | | Comparative Example 4 | Comparative Example 5 | Example 10 |
|---|---|---|---|---|
| Resin composition No. | | 4-13 | 4-14 | 4-15 |
| Blend (part) | | | | |
| Graft copolymer No. | 2-1 | | | |
| | 2-2 | | | |
| | 2-3 | | | 35 |
| | 2-4 | | | |
| | 2-5 | | | |
| Rigid copolymer No. | 3-1 | | | 65 |
| | 3-2 | | | |
| | 3-3 | | | |
| | 3-4 | | | |
| Hiwax 2203A | | | | |
| ABS resin | | 100 | | |
| Polycarbonate | | | | |
| Nylon-6 | | | | |
| Polybutylene terephthalate | | | | |
| Polyphenylene ether | | | | |
| AES resin | | | 100 | |
| Extender | | 0.3 | 0.3 | 0.3 |
| Vinihole AC-LQ | | 0.3 | 0.3 | |
| Sodium carbonate | | | | 0.5 |
| Talc | | 0.2 | 0.2 | 0.2 |
| Property | | | | |
| Surface appearance | | X | X | ○ |
| Surface gloss (%) | | 43.8 | 53.7 | 80.3 |
| State of inner foaming | | II | II | I |
| Specific gravity (g/cm³) | | 0.75 | 0.78 | 0.33 |

EXAMPLE 11, COMPARATIVE EXAMPLES 6, 7

The materials in the same blending ratioes as in Example 2, Comparative Examples 1 and 4 were pelletized respectively and then foamed while changing the take-off speed for the extrusion molding foamed product, and various characteristics thereof were tested in the same manner as in Example 1 and the results are shown in Table 7.

From Table 7, it can be seen that the foamable resin composition according to the present invention can be easily formed at a high rate of expansion even when the take-off speed is increased.

TABLE 7

| Example | Example 11 | | | | Comparative Example 6 | | | | Comparative Example 7 | | | |
|---|---|---|---|---|---|---|---|---|---|---|---|---|
| Blend | Blend in Example 2 | | | | Blend in Comparative Example 1 | | | | Blend in Comparative Example 4 | | | |
| Take-off speed (m/min.) | 0.5 | 1 | 1.5 | 2 | 0.5 | 1 | 1.5 | 2 | 0.5 | 1 | 1.5 | 2 |
| Property | | | | | | | | | | | | |
| Surface appearance | ◉ | ◉ | ◉ | ◉ | X | △ | ○ | ○ | X | X | X | ○ |
| Surface gloss (%) | 82.6 | 83.8 | 84.1 | 86.2 | 63.8 | 68.2 | 71.0 | 75.3 | 43.8 | 58.4 | 62.1 | 65.7 |
| State of inner foaming | I | I | I | I | II | II | II | II | II | II | II | II |
| Specific gravity (g/cm³) | 0.27 | 0.28 | 0.33 | 0.38 | 0.88 | 0.92 | 0.90 | 0.91 | 0.75 | 0.78 | 0.85 | 0.87 |

EXAMPLE 12, COMPARATIVE EXAMPLES 8, 9

The materials in the same blending ratioes as in Example 2 and Comparative Examples 1 and 4 were pelletized and the resultant pellets were covered with 0.3 part of Vinihole AC-LQ (manufactured by Eiwa Kasei Co.) as the foaming agent, 0.3 parts of Polyzomal MS (manufactured by Tokyo Shin-Nippon Kasei Co.) as the extender and 0.2 parts of talc and then injection molded at 240° C. For the resultant foamed molding products, various characteristics were tested in the same manner as in Example 1 and the results are shown in Table 8.

It can be seen from the Table 8 that the foamable resin composition according to the present invention can provide satisfactory property also by the injection molding.

TABLE 8

| Example | Example 12 | Comparative Example 8 | Comparative Example 9 |
|---|---|---|---|
| Blend | Blend in Example 2 | Blend in Comparative Example 1 | Blend in Comparative Example 4 |
| Property | | | |
| Surface appearance | ⊚ | Δ | X |
| Surface gloss (%) | 86.6 | 72.4 | 68.5 |
| State of inner foaming | I | II | II |
| Specific gravity (g/cm$^3$) | 0.38 | 0.91 | 0.86 |

From the examples and the comparative examples, it is apparent that the foamable resin composition according to the present invention has satisfactory characteristics with excellent surface appearance of product, capable of easily foaming at a high rate of expansion and with improved take-off speed in extrusion molding.

What is claimed is:

1. A foamable resin composition in which a foaming agent is mixed to a thermoplastic resin composition containing a graft copolymer prepared by emulsion graft polymerization of a vinyl monomer to an ethylene-propylene-non-conjugated diene copolymer rubber latex comprising 0.1 to 30 parts by weight of a modified low molecular weight α-olefin copolymer, which is an acid modified polyethylene comprising from 99.8 to 80% by weight of an α-olefin and from 0.2 to 20% by weight of an unsaturated carboxylic acid, uniformly dispersed in 100 parts by weight of an ethylene-propylene-non-conjugated diene copolymer.

2. A composition as defined in claim 1, wherein the ethylene content in the ethylene-propylene-non-conjugated diene copolymer is from 30 to 90 mol %.

3. A composition as defined in claim 1, wherein the vinyl monomer is selected from styrene, α-methylstyrene, p-methylstyrene, acrylonitrile, methacrylonitrile, methyl acrylate, methyl methacrylate, maleimide, N-methylmaleimide or N-phenylmaleimide.

4. A composition as defined in claim 1, wherein the weight ratio of the ethylene-propylene-non-conjugated diene copolymer rubber latex to the vinyl monomer is from 40:60 to 80:20.

5. A composition as defined in claim 1, wherein the mixing ratio of the foaming agent is from 0.1 to 5 parts by weight based on 100 parts by weight of the thermoplastic resin composition.

* * * * *